United States Patent
Chen et al.

(10) Patent No.: US 8,886,043 B2
(45) Date of Patent: Nov. 11, 2014

(54) OPTICAL NETWORK SYSTEM, OPTICAL LINE TERMINAL, OPTICAL NETWORK UNIT AND OPTICAL DISTRIBUTION NETWORK APPARATUS

(75) Inventors: Biao Chen, Shenzhen (CN); Liang Cheng, Shenzhen (CN); Dawei Wang, Shenzhen (CN); Songlin Zhu, Shenzhen (CN); Dan Geng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 160 days.

(21) Appl. No.: 13/522,053

(22) PCT Filed: Aug. 24, 2010

(86) PCT No.: PCT/CN2010/076318
§ 371 (c)(1),
(2), (4) Date: Jul. 13, 2012

(87) PCT Pub. No.: WO2011/130986
PCT Pub. Date: Oct. 27, 2011

(65) Prior Publication Data
US 2013/0051802 A1    Feb. 28, 2013

(30) Foreign Application Priority Data

Apr. 23, 2010   (CN) .......................... 2010 1 0159970

(51) Int. Cl.
*H04J 14/00* (2006.01)
*H04Q 11/00* (2006.01)
*H04B 10/272* (2013.01)

(52) U.S. Cl.
CPC .......... *H04Q 11/0067* (2013.01); *H04J 14/005* (2013.01); *H04B 10/272* (2013.01); *H04Q 2011/0064* (2013.01)
USPC ................... 398/72; 398/67; 398/68; 398/74; 398/75; 398/77; 398/78; 398/100; 398/99; 398/70; 398/71; 370/352; 370/392; 370/389; 370/468

(58) Field of Classification Search
CPC ... H04J 14/005; H04J 14/007; H04J 14/0228; H04J 14/08; H04J 14/0239; H04J 148/0242; H04J 14/0245; H04J 14/0246; H04J 14/0247; H04J 14/0249; H04J 14/025; H04J 14/0252
USPC .......... 398/66, 67, 68, 69, 70, 71, 72, 74, 75, 398/77, 78, 79, 59, 58, 98, 99, 100; 370/352, 389, 392, 465, 535, 468
See application file for complete search history.

(56) References Cited

U.S. PATENT DOCUMENTS

| | | | |
|---|---|---|---|
| 5,323,255 A | 6/1994 | Sierens et al. | |
| 7,065,298 B1 * | 6/2006 | Munroe et al. | 398/77 |
| 8,055,133 B2 * | 11/2011 | Lee et al. | 398/75 |
| 2003/0137975 A1 * | 7/2003 | Song et al. | 370/353 |
| 2008/0013950 A1 * | 1/2008 | Boudreault et al. | 398/59 |

FOREIGN PATENT DOCUMENTS

| | | |
|---|---|---|
| CN | 101090297 A | 12/2007 |
| CN | 101237293 A | 8/2008 |
| EP | 0512642 A1 | 11/1992 |
| EP | 1998481 A2 | 12/2008 |

OTHER PUBLICATIONS

International Search Report in international application No. PCT/CN2010/076318, mailed on Jan. 27, 2011.

English Translation of the Written Opinion of the International Search Authority in international application No. PCT/CN2010/076318, mailed on Jan. 27, 2011.

Yoshima et al., "10 Gb/s-Based PON Over OCDMA Uplink Burst Transmission Using SSFBG Encoder/Multi-Port Decoder and Burst-Mode Receiver", Journal of Lightwave Technology, vol. 28, No. 4, Feb. 15, 2010. (7 pages—see entire document).

\* cited by examiner

*Primary Examiner* — Hahn Phan
(74) *Attorney, Agent, or Firm* — Oppedahl Patent Law Firm LLC

(57) ABSTRACT

The disclosure provides an optical network system, an Optical Line Terminal (OLT), an Optical Network Unit (ONU) and an Optical Distribution Network (ODN) apparatus. The system includes: an OLT configured to modulate and encode at least one line of time-division-multiplexed downlink signals, synthesize the downlink signals encoded into one line and then output it, receive uplink signals, and decode the uplink signals received and then output them; an ODN configured to separate the downlink signals received into multiple lines and then output them, synthesize the uplink signals received into one line, and then output it to the OLT; and ONUs configured to receive the downlink signals output from the ODN, decode the downlink signals received and output them, encode one line of time-division-multiplexed uplink signals, and output the uplink signals encoded to the ODN. Decoding of the downlink signals and encoding of the uplink signals can further be implemented by the ODN. By means of the solution of the disclosure, a hybrid Passive Optical Network (PON) system based on a Time Division Multiplexing (TDM) technology and an Optical Code Division Multiple Access (OCDMA) technology.

7 Claims, 5 Drawing Sheets

OPTICAL NETWORK SYSTEM, OPTICAL LINE TERMINAL, OPTICAL NETWORK UNIT AND OPTICAL DISTRIBUTION NETWORK APPARATUS

TECHNICAL FIELD

The disclosure relates to the field of optical communication technologies, and in particular to a hybrid Passive Optical Network (PON) system, an Optical Line Terminal (OLT), an Optical Network Unit (ONU) and an Optical Distribution Network (ODN) apparatus.

BACKGROUND

In current data communication, an access network becomes infrastructure of a communication network since the access network is a transport entity of a Service Node Interface (SNI) and a related User Network Interface (UNI). Because of the feature, the access network should adopt a fair, flexible and secure multi-address technology. A PON, due to features of wide frequency band, large capacity, convenient capacity expansion and applicability to high-speed data transmission, becomes a hot technology of an optical access network and further is the most popular technology in the current optical access network technologies.

A typical PON, as shown in FIG. 1, includes an OLT, an ODN and an ONU, and may further include an Optical Network Terminal (ONT), wherein one or more ONTs are connected with the ONU and serves as specific user(s) of the ONU.

Respective main part of the typical PON and function thereof are as follows:

the OLT, which mainly provides an optical interface between a network and an ODN, and can separate exchange services from non-exchange services, manage signaling and monitor information from an ONU and provide maintenance and supply capability for the OLT per se and the ONU;

the ODN, which is connected with the OLT and the ONU mainly through one or more optical splitters, takes charge of distributing downlink data and integrating uplink data, finishes power distribution, wavelength multiplexing and the like of optical signals, and generally adopts a tree branch structure; and the ONU, which provides user data, video, and an interface between a telecommunication network and an optical network, converts received optical signals into signals required by a user, and cooperates with the ONT to form a network terminal.

At present, there are three types of PONs based on different multiplexing technologies, i.e., a PON based on Time Division Multiplexing (TDM-PON), a PON based on a Wavelength Division Multiplexing (WDM-PON) and a PON based on Optical Code Division Multiple Access (OCDMA-PON).

The TDM-PON is the most mature PON technology; an Ethernet Passive Optical Network (EPON) and a Gigabit Passive Optical Network (GPON) widely used at present both belong to the TDM-PON technology. Both uplink and downlink of the TDM-PON system use the TDM technology, each utilizing a wavelength. Although the TDM-PON has advantages of mature technology, lower cost and the like, it is very difficult to realize an electricity based high-speed burst receiving technology when a higher bandwidth is expanded; it is not only needed to add a complex bandwidth management algorithm, but also proposed to have a demanding requirement on semiconductor and optoelectronics industries in the aspects of clock synchronization and fast optical signal detection. In addition, the TDM-PON technology further has problems of fragile network system security and difficult fiber fault location.

With continuous increases of bandwidth requirements and user number, a Wavelength Division Multiplexing (WDM) technology is gradually introduced to an access network and is combined with a PON to form a WDM-PON network. Multiple users share the same optical fiber in the WDM-PON network, however, different users are allocated with different wavelengths; in this way, a bandwidth utility ratio can be provided. The WDM is divided into Coarse Wavelength Division Multiplexing (CWDM) and Dense Wavelength Division Multiplexing (DWDM), wherein a channel spacing of the CWDM is 20 nm while a channel spacing of the DWDM is 0.2 nm to 1.2 nm. A G1983 standard having formulated by an International Telecommunication Union Telecommunication Standardization Sector (ITU-T) is only applicable to the WDM technology of 113 μm/115 μm, i.e., the CWDM. The number of wavelengths that the DWDM can provide is greatly increased. However, compared with other wideband access, an initial investment of the WDM-PON is huge. Furthermore, various photoelectric devices required by the WDM-PON are immature, for example, a multi-frequency laser, a broad-tuning single frequency laser, a Light-Emitting Diode (LED) of an integrated amplifier and the like have not entered a large-scale commercialized application, which is a key of the WDM-PON moving towards marketization.

The OCDMA is a multi-address multiplexing technology which combines a large bandwidth of an optical fiber media and flexibility of Code Division Multiple Access (CDMA). The OCDMA is highly concerned in respect of upgrading a present PON system or serving as a main technology of a next-generation PON, since the OLT and ONU the OCDMA system can use a relatively simple multiplexing/multiple access function without needing synchronization, the present PON does not have to make great upgrade for being applied to the OCDMA; in addition, some attractive technologies of the OCDMA per se, such as all-optical processing, real asynchronous transmission, soft capacity, transparent agreement, flexible control of Quality of Service (QoS) and the like, make a research on the OCDMA-PON be increasingly concerned by people.

However, the OCDMA-PON system has inherent defects as follows: the number of code multiplexing is limited, which then limits the number of access users of the system; as an increase of multiplexing number, a crosstalk between users is increased gradually, which influences the number of access users of the system to some extent; and a greater bandwidth needed by the OCDMA system which adopts a spread spectrum technology and a Bit Error Rate (BER) inherent defect caused by interference between users influence the number of access users of the system.

An Optical encoder/decoder is a core part of the OCDMA system. At a transmitting end, the optical encoder converts data bits into a spread spectrum sequence; and at a receiving end, the optical decoder restores the spread spectrum sequence to the data bits by using a related decoding principle. In a CDMA communication system, all users occupy the same frequency band and time of the same channel together, and signals that different users use to transmit information are distinguished by different encoding sequences, that is, each user is allocated with a pseudorandom sequence. At a transmitting end, information of each user generates a pseudorandom sequence through the optical encoder/decoder; since the encoder/decoder is unique, the pseudorandom sequence is unique too; each information bit of a user is encoded into a pulse string; and at a receiving end, a user uses the encoder/decoder corresponding to the same pseudorandom sequence to perform a related operation, ao as to restore the transmitted information. The pseudorandom sequence is called an address code of an user, and each encoding pulse is called a chip. The optical encoder/decoder plays a role of encryption and decryption on optical signals, thereby increasing security of a network. At present, main types of the OCDMA encoder/decoder includes: a time domain encoding/decoding scheme based on optical delay line, a frequency domain encoding/decoding scheme based on diffraction grating and phase mask, an encoding/decoding scheme based on Fiber Bragg Grating (FBG) and an encoding/decoding scheme based on Array Waveguide Grate (AWG).

A hybrid PON is a PON adopting the above two or more technologies.

SUMMARY

The purpose of the disclosure is to provide a hybrid Passive Optical Network (PON) system, an Optical Line Terminal (OLT), an Optical Network Unit (ONU) and an Optical Distribution Network (ODN) apparatus, to realize a hybrid PON system based on a Time Division Multiplexing (TDM) technology and an Optical Code Division Multiple Access (OCDMA) technology.

In order to realize the purpose above, the disclosure provides an optical network system, which includes:

an OLT configured to modulate and encode at least one line of time-division-multiplexed downlink signals, wherein different encoding being applied to different lines of the downlink signals, and to synthesize the downlink signals encoded into one line and then output it; and further configured to receive uplink signals, and decode the uplink signals received and then output them;

an ODN configured to receive downlink signals output from the OLT, separate the downlink signals received into multiple lines and then output them directly or output them after decoding; and further configured to receive uplink signals and synthesize the uplink signals received into one line, and then output it to the OLT, or encode received multiple lines of time-division-multiplexed uplink signals and synthesize the signals encoded into one line, and then output it to the OLT, wherein different encoding being applied to different lines of the time-division-multiplexed uplink signals;

at least one ONU each configured to receive downlink signals directly output from the ODN, decode the downlink signals received and output them, or output the downlink signals received which are output from the ODN after being decoded by the ODN; and further configured to encode one line of time-division-multiplexed uplink signals, wherein different encoding being applied to different lines of the time-division-multiplexed uplink signals, and output the uplink signals encoded to the ODN, or directly output the time-division-multiplexed uplink signals to the ODN which encodes the uplink signals and then outputs them to the OLT;

wherein, the OLT may include: at least one first processing module and a first optical coupler, wherein each first processing module includes: a first time-division-multiplexing processing module and a first optical encoding/decoding module, wherein the first time-division-multiplexing processing module is configured to modulate at least one line of time-division-multiplexed downlink signals to an optical carrier, then send the modulated downlink signals; and to receive uplink signals and output the received uplink signals;

the first optical encoding/decoding module is connected with the first time-division-multiplexing processing module, and configured to encode downlink signals sent from the first time-division-multiplexing processing module and then output the encoded signals; and to receive uplink signals, decode the received uplink signals and output them to the connected first time-division-multiplexing processing module;

the first optical coupler is connected with each first optical encoding/decoding module included in each of the at least one first processing module and configured to synthesize downlink signals output by the first optical encoding/decoding module of the of the at least one first processing module into one line and output it; and to receive uplink signals, separate the uplink signals received into multiple lines and output them to the connected each first optical encoding/decoding module.

The first time-division-multiplexing processing module may include:

a downlink modulation module configured to modulate at least one line of time-division multiplexed downlink signals to an optical carrier and then send the modulated downlink signals to the connected first optical encoding/decoding module;

an uplink receiving module configured to receive uplink signals output after being decoded by the first optical encoding/decoding module, and output the received uplink signals.

The first time-division-multiplexing processing module may further include:

a first circulator through which the downlink modulation module and the uplink receiving module are connected with the first optical encoding/decoding module.

The ONU may include:

a second optical encoding/decoding module configured to decode downlink signals output by the ODN and encode received time-division multiplexed uplink signal;

at least one second processing module connected with the second optical encoding/decoding module, wherein each second processing module is configured to receive downlink signals output after being decoded by the second optical encoding/decoding module, and to output time-division multiplexed modulated uplink signals to the second optical encoding/decoding module at a pre-allocated timeslot.

The ODN may include:

a second optical coupler connected with the OLT and the at least one ONU.

The second processing module may include:

a downlink receiving module configured to receive downlink signals decoded by the second optical encoding/decoding module;

an uplink modulation module configured to modulate at least one line of uplink signals to an optical carrier and output the modulated uplink signals to the second optical encoding/decoding module at a pre-allocated timeslot;

a second circulator through which the downlink receiving module and the uplink modulation module are connected with the second optical encoding/decoding module.

The ODN may include:

a second optical coupler connected with the OLT and configured to separate one line of downlink signals output by the OLT into multiple lines, synthesize received multiple lines of time-division multiplexed uplink signals into to one line and then output it; and a plurality of second optical encoding/decoding modules each configured to decode one line of downlink signals output by the second optical coupler, encode time-division multiplexed uplink signals output by the ONU and then output them to the second optical coupler;

the ONU may include:

at least one second processing module connected with one of the plurality of second optical encoding/decoding modules, wherein each second processing module is configured to receive downlink signals output after being decoded by the second optical encoding/decoding module and to output time-division multiplexed modulated uplink signals to the second optical encoding/decoding module at a pre-allocated timeslot.

An Optical Line Terminal (OLT) includes:

a signal processing module configured to modulate and encode at least one line of time-division multiplexed downlink signals, wherein different encoding being applied to different lines of the downlink signals; and further configured to receive uplink signals, decode the uplink signals received and then output them, wherein the uplink signals are uplink signals output by an Optical Network Unit (ONU) after the ONU encodes at least one line of time-division multiplexed uplink signals, wherein different encoding being applied to different lines of the time-division multiplexed uplink signals;

a first optical coupler connected with the signal processing module, and configured to synthesize all lines of downlink signals encoded by the signal processing module into one line and then output it; and configured to receive uplink signals, and separate the uplink signals received into multiple lines and then output them to the signal processing module.

The signal processing module may include: at least one first processing module and a first optical coupler, wherein each first processing module includes: a first time-division-multiplexing processing module and a first optical encoding/decoding module, wherein the first time-division-multiplexing processing module is configured to modulate at least one line of time-division-multiplexed downlink signals to an optical carrier, then send the modulated downlink signals; and configured to receive uplink signals and output the received uplink signals;

the first optical encoding/decoding module is connected with the first time-division-multiplexing processing module and configured to encode downlink signals sent from the first time-division-multiplexing processing module and then output the downlink signals encoded; and configured to receive uplink signals, decode the received uplink signal and output them to the connected first time-division-multiplexing processing module;

the first optical coupler is further connected with each first optical encoding/decoding module of the each first processing module, and configured to synthesize downlink signals output after being encoded by the each encoding/decoding module of the each first processing module into one line and output it; and configured to receive uplink signals, separate the uplink signals received into multiple lines and output them to the connected first optical encoding/decoding module.

An Optical Network Unit (ONU) includes:

a second optical encoding/decoding module configured to decode downlink signals output by an Optical Line Terminal (OLT) through an Optical Distribution Network (ODN), encode received time-division multiplexed uplink signals and then output the encoded uplink signals to the OLT through the ODN, wherein the downlink signals output by the OLT are signals output after at least one line of time-division multiplexed downlink signals is modulated and encoded, wherein different encoding being applied to different lines of the time-division multiplexed downlink signals;

at least one second processing module connected with the second optical encoding/decoding module, wherein each second processing module is configured to receive downlink signals output after being decoded by the second optical encoding/decoding module, and output time-division multiplexed modulated uplink signals to the second optical encoding/decoding module.

An Optical Distribution Network (ODN) apparatus includes:

a second optical coupler configured to separate one line of downlink signals output by an Optical Line Terminal (OLT) into multiple lines, synthesize received multiple lines of time-division multiplexed uplink signals into to one line and then output it to the OLT, wherein the downlink signals output by the OLT are signals output after at least one line of time-division multiplexed downlink signals is modulated and encoded, wherein different encoding being applied to different lines of the time-division multiplexed downlink signals;

a plurality of second optical encoding/decoding modules each configured to decode one line of downlink signals output by the second optical coupler, encode time-division multiplexed uplink signals output by an Optical Network Unit (ONU) and then output them to the second optical coupler.

The technical effects of the disclosure are as follows:

at the downlink, at least one line of time-division multiplexed downlink signals is modulated and encoded by the OLT, wherein different lines of downlink signals apply different codes and the encoded signals are output to the ONU through the ODN; at the uplink, at least one line of time-division multiplexed uplink signals is encoded by the ONU or the ODN, wherein different lines of time-division multiplexed uplink signals apply different codes and the encoded signals are output to the OLT, thus a hybrid PON system based on TDM and OCDMA is realized conveniently, the defects of fragile network system security, limited bandwidth expansion and limited network upgradeability and the technical problem of limited number of OCDMA-PON access user in the TDM-PON are avoided; therefore, the network security is higher and the capacity of user access is greater.

DETAILED DESCRIPTION

To make the purpose, technical solution and advantages of the disclosure more clear, the disclosure will be further illustrated in detail in combination with the accompanying drawings and specific embodiments hereinafter.

The disclosure provides a hybrid PON system, for realizing a combination of a TDM-PON and an OCDMA PON, which includes:

an OLT configured to modulate and encode at least one line of time-division-multiplexed downlink signals, wherein different encoding being applied to different lines of the downlink signals, and to synthesize the downlink signals encoded into one line and then output it; and further configured to receive uplink signals, and decode the uplink signals received and then output them;

an ODN configured to receive downlink signals output from the OLT, separate the downlink signals received into multiple lines and then output them directly or output them after decoding; and further configured to receive uplink signals and synthesize the uplink signals received into one line, and then output it to the OLT, or encode received multiple lines of time-division-multiplexed uplink signals and synthesize the signals encoded into one line, and then output it to the OLT, wherein different encoding being applied to different lines of the time-division-multiplexed uplink signals;

at least one ONU each configured to receive downlink signals directly output from the ODN, decode the downlink signals received and output them, or output the downlink signals received which are output from the ODN after being decoded by the ODN; and further configured to encode one line of time-division-multiplexed uplink signals, wherein different encoding being applied to different lines of the time-division-multiplexed uplink signals, and output the uplink signals encoded to the ODN, or directly output the time-division-multiplexed uplink signals to the ODN which encodes the uplink signals and then outputs them to the OLT.

In one embodiment of the disclosure, the second optical encoding/decoding module can be set at the ONU side, wherein the ONU can realize decoding of the downlink signals and encoding of the uplink signals; in other embodiments of the disclosure, the second optical encoding/decoding module can be set at the ODN side, wherein the ODN can realize decoding of the downlink signals and encoding of the uplink signals.

Figure 1:
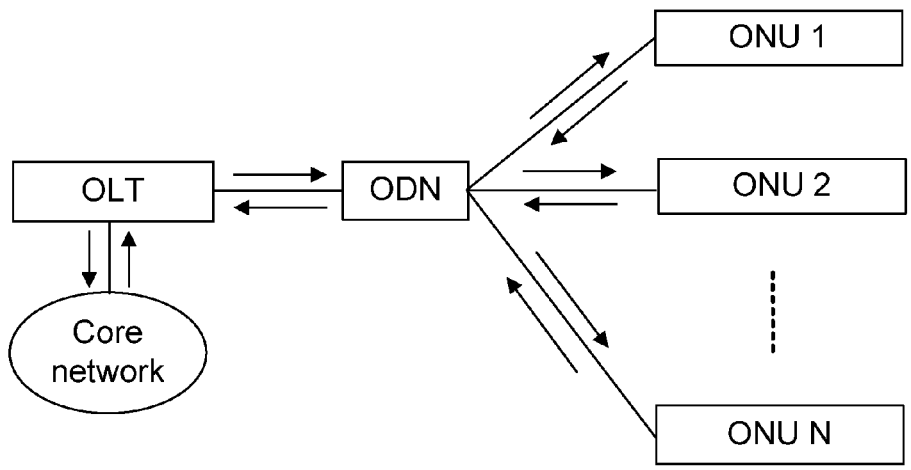
FIG. 1 shows a structure diagram of a typical PON in the related art.
Figure 2:
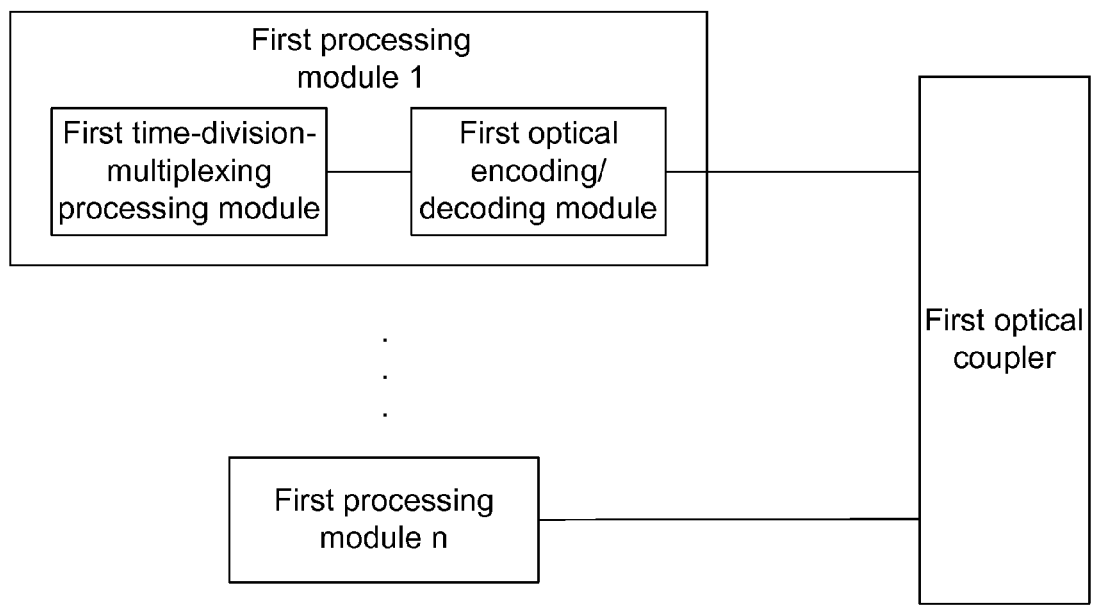
FIG. 2 shows a structure diagram of an OLT in a hybrid PON system according to one embodiment of the disclosure.

FIG. 2 shows a structure diagram of an OLT in a hybrid PON system according to one embodiment of the disclosure; as shown in FIG. 2, the OLT of the embodiment includes: at least one first processing module and a first optical coupler, wherein the at least one first processing module refers to the first processing module 1 to the first processing module n in the embodiment, each of the first processing modules includes: the first time-division-multiplexing processing module configured to modulate at least one line of time-division-multiplexed downlink signals to an optical carrier, then send the modulated downlink signals; and to receive uplink signals and output the received uplink signals; and the first optical encoding/decoding module connected with the first time-division-multiplexing processing module, and configured to encode downlink signals sent from the first time-division-multiplexing processing module and then output the encoded signals; and to receive uplink signals, decode the received uplink signals and output them to the connected first time-division-multiplexing processing module; in the embodiment, first optical encoding/decoding modules of different first processing modules are different, to realize that different coding are applied to different time-division multiplexed downlink signals;

the first optical coupler is connected with each first optical encoding/decoding module included in each of the at least one first processing module and configured to synthesize downlink signals output by the first optical encoding/decoding module of the of the at least one first processing module into one line and output it; and to receive uplink signals, separate the uplink signals received into multiple lines and output them to the connected each first optical encoding/decoding module.

Figure 3:
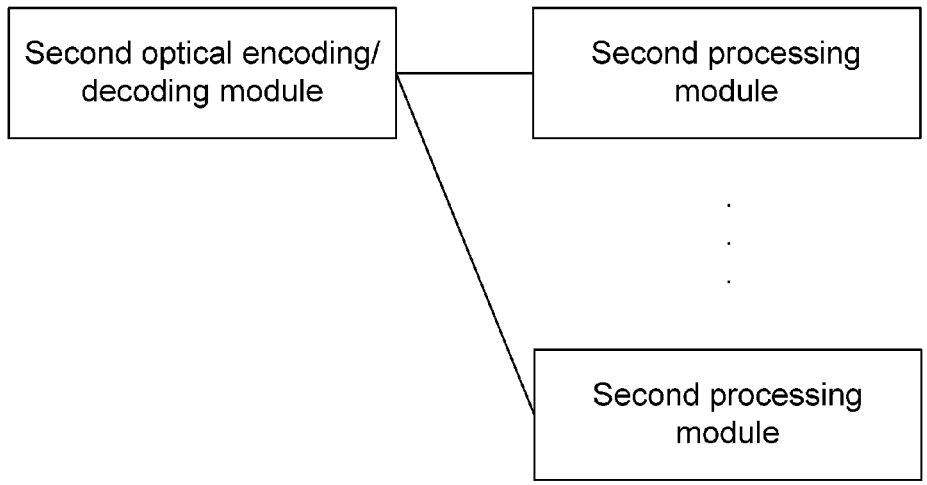
FIG. 3 shows a structure diagram of a hybrid PON system according to one embodiment of the disclosure.

FIG. 3 shows a structure diagram of a hybrid PON system according to one embodiment of the disclosure; as shown in FIG. 3, in the hybrid PON system, the ONU includes:

a second optical encoding/decoding module configured to decode downlink signals output by the ODN, encode received time-division multiplexed uplink signal and then output it to the OLT through the ODN;

a plurality of second processing modules connected with the second optical encoding/decoding module, wherein each second processing module is configured to receive downlink signals output after being decoded by the second optical encoding/decoding module, and to output time-division multiplexed modulated uplink signals to the second optical encoding/decoding module at a pre-allocated timeslot. Specifically, one second optical encoding/decoding module can be connected with a plurality of processing modules through one coupler. Each of the second processing modules sends the modulated uplink signals to the second optical encoding/decoding module at a pre-allocated timeslot, so that the second optical encoding/decoding module encodes the modulated uplink signals and then sends them to the OLT through an optical transmission network. In this way, it is realized that one encoder/decoder corresponds to a group of TDM signals, thus the capacity of user access of the system is expanded. In specific implementation, one second processing module such as one TDM-PON ONU can correspond to one specific user.

The ODN of the embodiment includes: a second optical coupler connected with the OLT and the at least one ONU.

In other embodiments of the disclosure, the second optical encoding/decoding module can be connected with one second processing module only.

The first and second optical encoding/decoding modules above are configured to encode or decode signals; in specific implementation, the first and second optical encoding/decoding modules can realize an optical encoding function and an optical decoding function through an encoder and a decoder respectively, and also can realize encoding and decoding through an optical encoder/decoder as needed.

Figure 4:
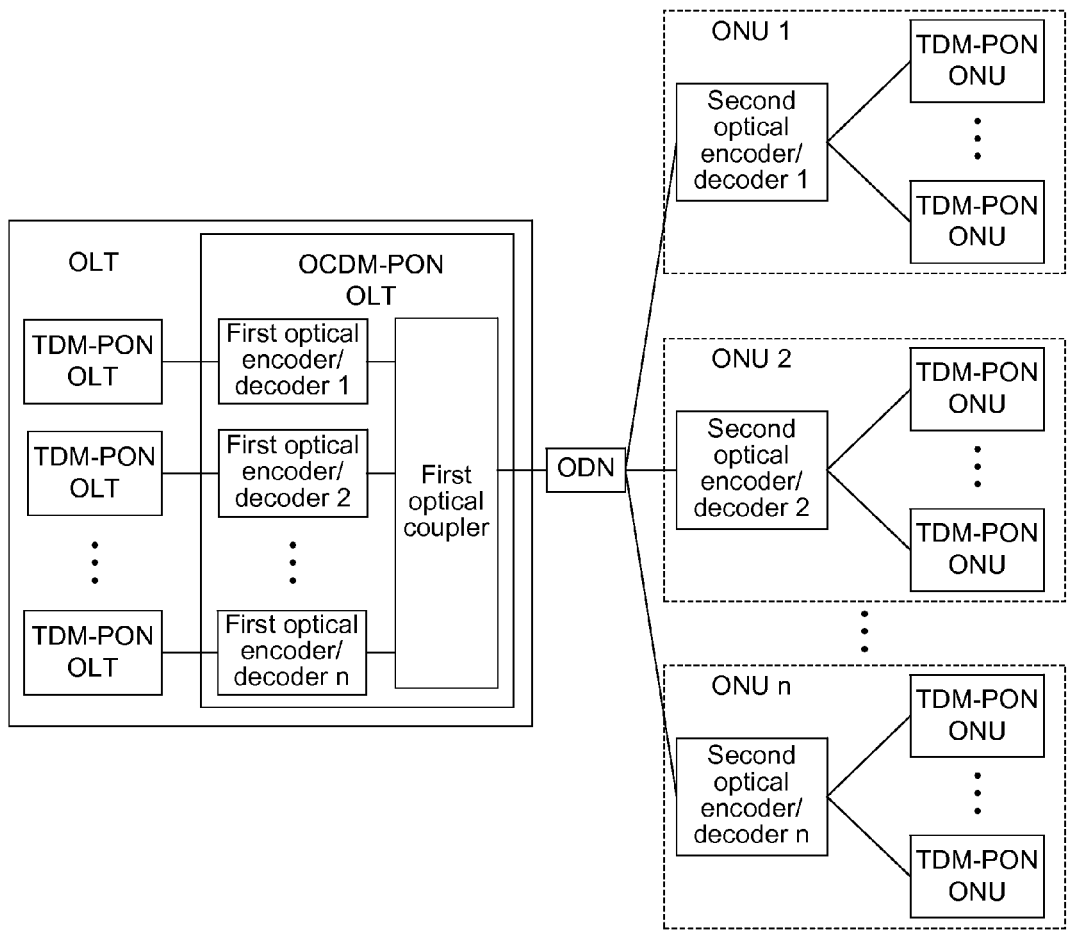
FIG. 4 shows a structure diagram of a hybrid PON system according to another embodiment of the disclosure.

As one implementation way of the embodiment of the disclosure, the first time-division-multiplexing processing module can be served by an OLT of a TDM-PON of the related art; in this way, only a first optical encoding/decoding module connected with the OLT of the TDM-PON and a first optical coupler connected with the first optical encoding/decoding module are needed to realize the OLT of the embodiment of the disclosure. As one implementation way of the embodiment of the disclosure, the second processing module can be served by an ONU of a TDM-PON of the related art, in this way, only a second optical encoding/decoding module connected with the ONU of the TDM-PON needs to be added on the basis of the ONU of the existing TDM-PON to realize the ONU of the hybrid PON according to the embodiment of the disclosure. Specifically, a structure diagram of a hybrid PON system according to one embodiment of the disclosure shown in FIG. 4 is referred to. As shown in FIG. 4, an OLT of the hybrid PON system of the embodiment can be construed as consisting of an OLT part based on a TDM technology, i.e., a TDM-PON OLT, and an OLT part based on an OCDMA technology, i.e., an OCDMA-PON OLT; and an ONU of the hybrid PON of the embodiment can be construed as consisting of an ONU part based on a TDM technology and an ONU part based on an OCDMA technology.

As shown in FIG. 4, the OLT of the embodiment of the disclosure consists of a plurality of TDM-PON OLTs and one OCDMA-PON OLT, wherein each TDM-PON OLT is connected with one optical encoder/decoder (first optical encoder/decoder) of the OCDMA-PON OLT to form a link structure of receiving and transmitting a line of data, i.e., a first processing module; signals of a plurality of the data receiving/transmitting links above (i.e., a plurality of the first processing modules) are synthesized into one line through a first optical coupler and are transmitted to the ODN; the respective devices above are connected through transmission optical fibres. The OLT is connected with one or more ONUs through the ODN. In the embodiment, taking n TDM-PON OLTs for example, each of the TDM-PON OLTs is connected with one of the first optical encoder/decoder 1 to the first optical encoder/decoder n respectively; in the embodiment, the optical encoder/decoder connected with different TDM-PON OLTs are different, so that different coding are applied to different downlink signals output from different TDM-PON OLTs.

In the PON system of the embodiment, the second optical decoder in the ONU is connected with a plurality of TDM-PON ONUs; each of the TDM-PON ONUs sends uplink signals at a pre-allocated timeslot. In specific implementation, the second optical encoder/decoder can be connected with a plurality of TDM-PON ONUs through a coupler. When time-division multiplexed downlink signals are processed, a downlink data stream is decoded by the encoder/decoder and then is sent to each of the TDM-PON ONUs to be received by the downlink receiving module of each of the TDM-PON ONUs; when uplink signals are processed, a data stream is sent first based on the timeslot pre-allocated by the system, then is encoded by the second optical encoder/decoder and finally is transmitted to the ODN.

In the embodiment, the number of the first encoder/decoders is corresponding to the number of the second encoder/decoders and the number of the ONUs of the system, wherein the respective number above is n and the n is a natural number.

Figure 5A:
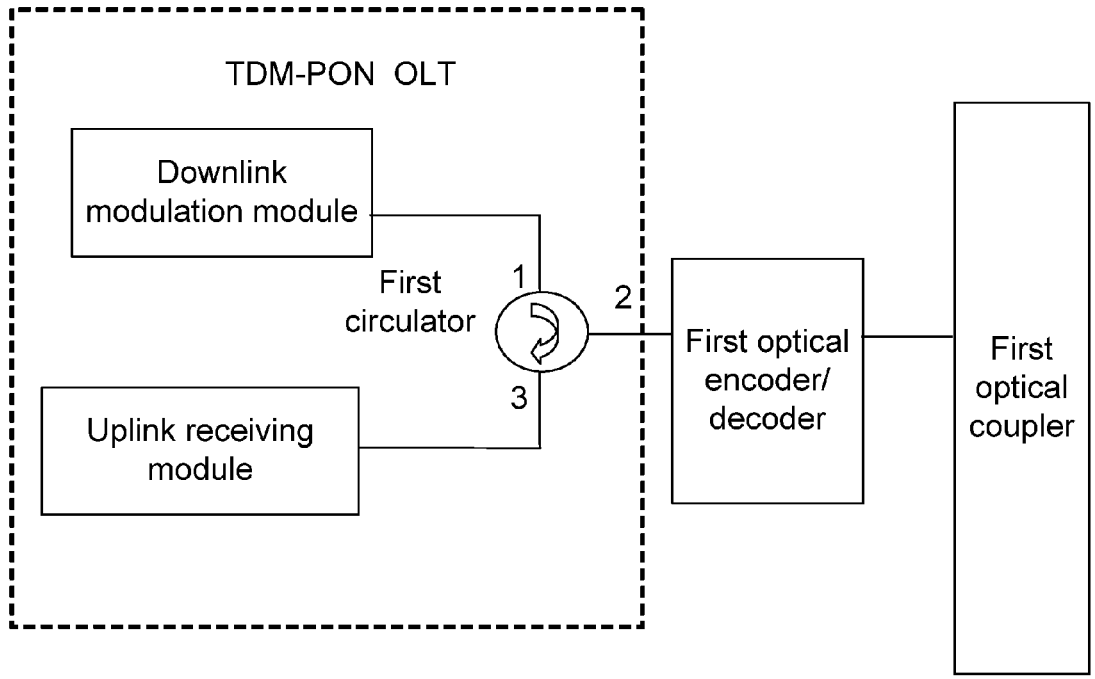
FIG. 5A shows a structure diagram of a first processing module in a hybrid PON system according to one embodiment of the disclosure.

FIG. 5A shows a structure diagram of a first processing module in a hybrid PON system according to one embodiment of the disclosure; as shown in FIG. 5A, a first time-division-multiplexing processing module includes: a downlink modulation module configured to modulate at least one line of time-division multiplexed downlink signals to an optical carrier and then send the modulated downlink signals to the connected first optical encoding/decoding module; in the embodiment, taking a first optical encoder/decoder 1 for example; an uplink receiving module configured to receive uplink signals output after being decoded by the first optical encoding/decoding module, and output the received uplink signals; in the embodiment, the first time-division-multiplexing processing module further includes: a first circulator through which the downlink modulation module and the uplink receiving module are connected with the first optical encoding/decoding module. A port 1 of the first circulator is connected with the downlink modulation module, a port 2 of the first circulator is connected with the optical encoder/decoder 1, and a port 3 of the first circulator is connected with the uplink receiving module. The downlink modulation module is connected with the optical encoder/decoder 1 through the first circulator to form a link structure of encoding and sending a line of data; and the uplink receiving module is connected with the optical encoder/decoder 1 through the first circulator to form a link structure of decoding and receiving a line of data. The embodiment is illustrated by taking the first link for example only, and other links connected to other optical encoder/decoders are similar in the embodiment and no further description is needed here.

In a channel, when the OLT processes the downlink signals, the downlink data modulation module modulates a user data stream in a data core network and then sends the user data stream to the port 1 of the first circulator; then, the user data stream is output from the port 2 of the first circulator, encoded by the first optical encoder/decoder and input to the first optical coupler; finally, the data stream is transmitted to the ODN through an optical fiber and then sent to the ONU. When the OLT processes uplink data, the encoded data stream transmitted from the ODN is transmitted to each data receiving link of the OLT through the first optical coupler, wherein the encoded data stream is first decoded by the first optical encoder/decoder to obtain restored corresponding user data stream; then, the user data stream is input to the port 2 of the first circulator and output from the port 3 of the first circulator; finally, the data stream is received by the data receiving module of the TDM-PON OLT and uploaded to the core network.

The optical encoder/decoder in the OLT is an encoder when processing downlink signals and is a decoder when processing uplink signals. In addition, the optical encoder/decoder of the OLT is one-to-one corresponding to the optical encoder/decoder of the ONU, and thus original data can be restored.

Figure 5B:
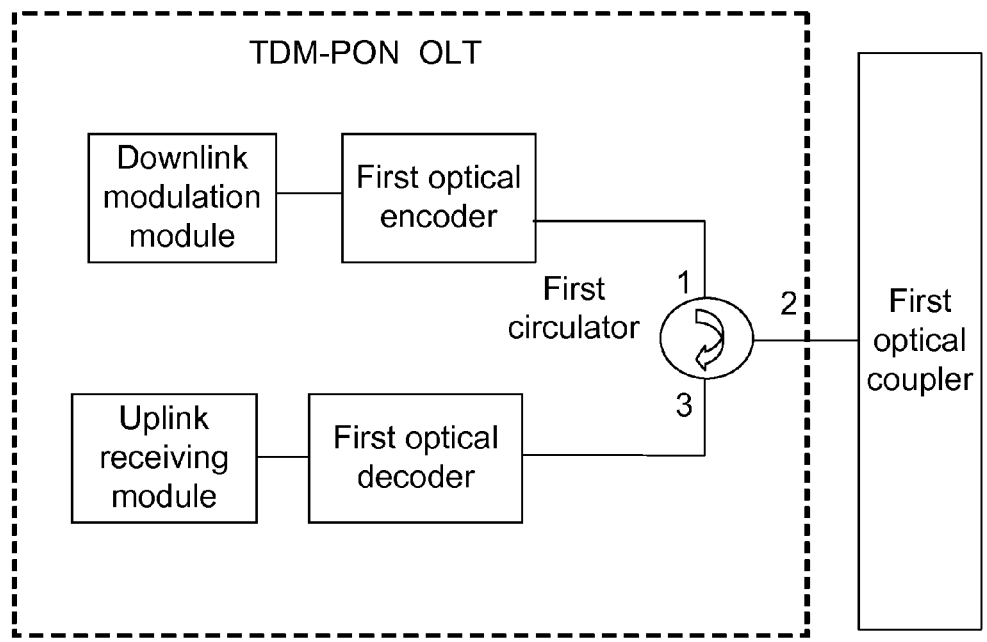
FIG. 5B shows a structure diagram of a first processing module in a hybrid PON system according to another embodiment of the disclosure.

FIG. 5B shows a structure diagram of a first processing module in the hybrid PON system according to another embodiment of the disclosure; as shown in FIG. 5B, a function of encoding downlink signals is realized by a first optical encoder, a function of decoding uplink signals is realized by a first optical decoder, the optical encoder is connected between a downlink modulation module and a port 1 of a first circulator, and the optical decoder is connected between an uplink receiving module and a port 3 of the first circulator.

Figure 6A:
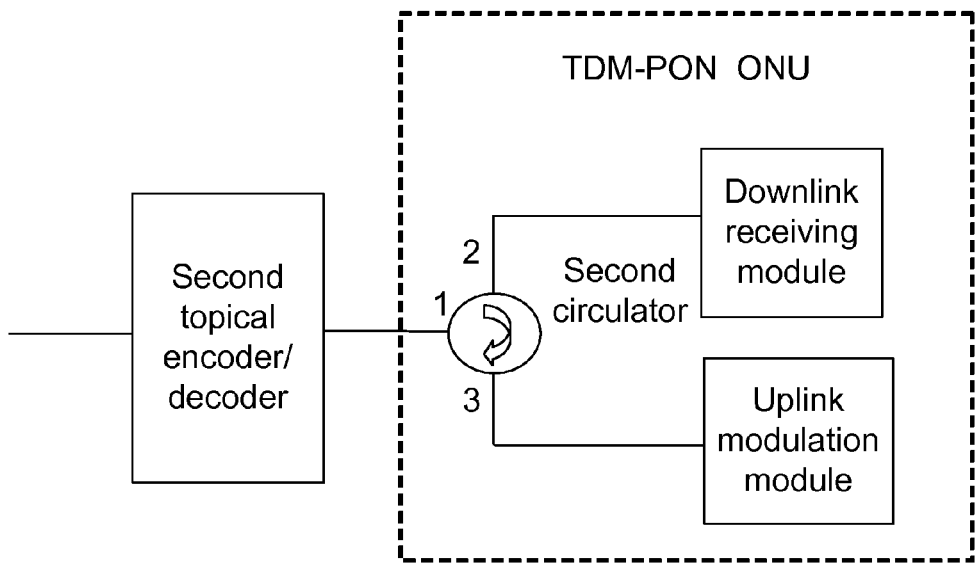
FIG. 6A shows a structure diagram of a second processing module according to one embodiment of the disclosure.

ONUs of the embodiment of the disclosure can be construed as consisting of TDM-PON ONUs and OCDMA-PON ONUs; as shown in FIG. 4, each of the ONUs of the embodiment of the disclosure includes: a second optical encoder/decoder and at least one second processing module; in the embodiment, the second processing module is served by the TDM-PON ONU. After at least one the TDM-PON ONU transmits uplink signals at a pre-allocated timeslot, the uplink signals are encoded by the second optical encoder/decoder encodes and then transmitted to the ODN. In the embodiment, the second processing module, i.e., the TDM-PON ONU, is connected with the second optical encoder/decoder of the OCDMA-PON ONU to form a link structure of receiving and transmitting a line of data in the ONU. FIG. 6A shows a structure diagram of a second processing module according to one embodiment of the disclosure; as shown in FIG. 6A, a second processing module of the embodiment, i.e., a TDM-PON ONU, mainly includes: a downlink receiving module configured to receive downlink signals decoded by a second optical encoding/decoding module; and an uplink modulation module configured to modulate at least one line of uplink signals to an optical carrier and output the modulated uplink signals to the second optical encoding/decoding module at a pre-allocated timeslot. In the embodiment, the second processing module further includes: a second circulator through which the downlink receiving module and the uplink modulation module are connected with the second optical encoding/decoding module. Wherein, the downlink receiving module is connected with the second optical encoder/decoder through a port 2 of the second circulator to form a link structure of decoding and receiving a line of data; the uplink modulation module is connected with the second optical encoder/decoder through a port 3 of the second circulator to form a link structure of encoding and transmitting a line of data; and the second optical encoder/decoder is connected with the second circulator through a port 1 of the second circulator. The ODN includes: a second optical coupler connected with an OLT and at least one ONU. Signals of one or more ONUs are synthesized into one line through the second optical coupler and then are output to the OLT; the devices above are connected through transmission optical fibres; and the ONU is connected with the OLT through the ODN.

In a channel, when the ONU processes downlink signals, user data is sent to each ONU end, and the user data is first decoded by the second optical encoder/decoder, then the restored data stream is input to the port 1 of the second circulator and is output from the port 2 of the second circulator, finally, the data stream is received by the downlink receiving module. When the ONU processes uplink data, the uplink data modulation module modulates a user data stream and then inputs the user data stream to the port 3 of the second circulator at the timeslot allocated by the system; then the data stream is output from the port 1 of the second circulator and is encoded by the second optical encoder/decoder; finally, the encoded data stream is uploaded to the OLT via the ODN. As shown in FIG. 6, in the ONU of the embodiment, one second optical encoder/decoder corresponds to one second processing module, i.e., one TDM-PON ONU in the embodiment.

Figure 6B:
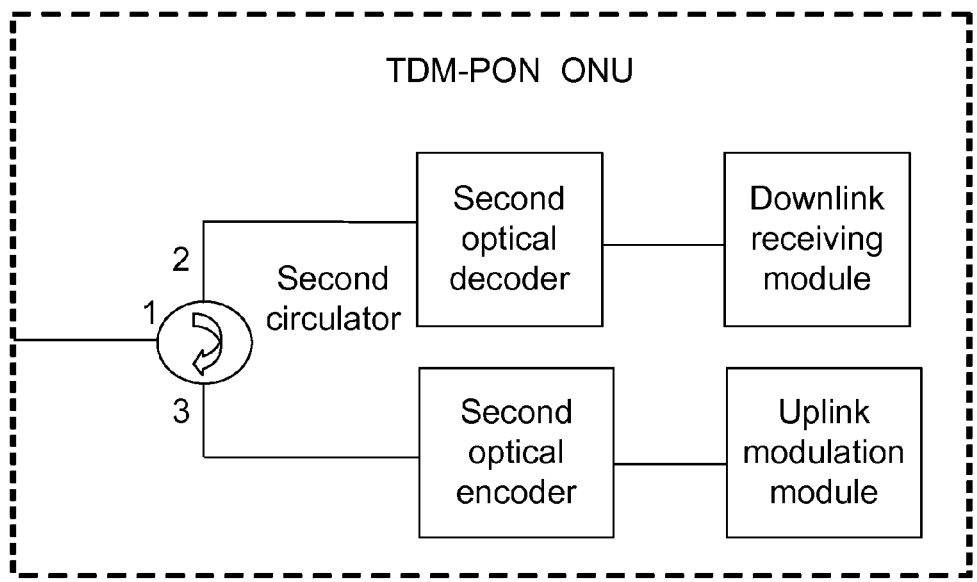
FIG. 6B shows a structure diagram of a second processing module according to another embodiment of the disclosure.

FIG. 6B shows a structure diagram of a second processing module according to another embodiment of the disclosure; as shown in FIG. 6B, encoding of uplink signals is realized by a second optical encoder, decoding of downlink signals is realized by the second optical decoder, the second optical encoder is connected between an uplink modulation module and a port 3 of a second circulator, and the second optical decoder is connected between a downlink receiving module and a port 2 of the second circulator.

Figure 7:
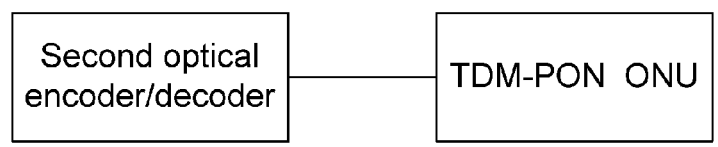
FIG. 7 shows a structure diagram of a second processing module according to yet another embodiment of the disclosure.

FIG. 7 shows another corresponding form of a TDM-PON ONU and a second optical decoder, i.e., an OCDMA-PON ONU, in an ONU. In the embodiment, one OCDMA-PON ONU corresponds to one TDM-PON ONU, that is, one second optical decoder corresponds to one second processing module; in the embodiment, the second processing module is realized by the TDM-PON ONU, wherein the structure of the TDM-PON ONU can be referred to FIG. 6.

The second optical encoder/decoder in the ONU is an encoder when processing uplink signals and is a decoder when processing downlink signals. In addition, the optical encoder/decoder of the ONU is one-to-one corresponding to the optical encoder/decoder of the OLT, and thus original data can be restored.

Figure 8:
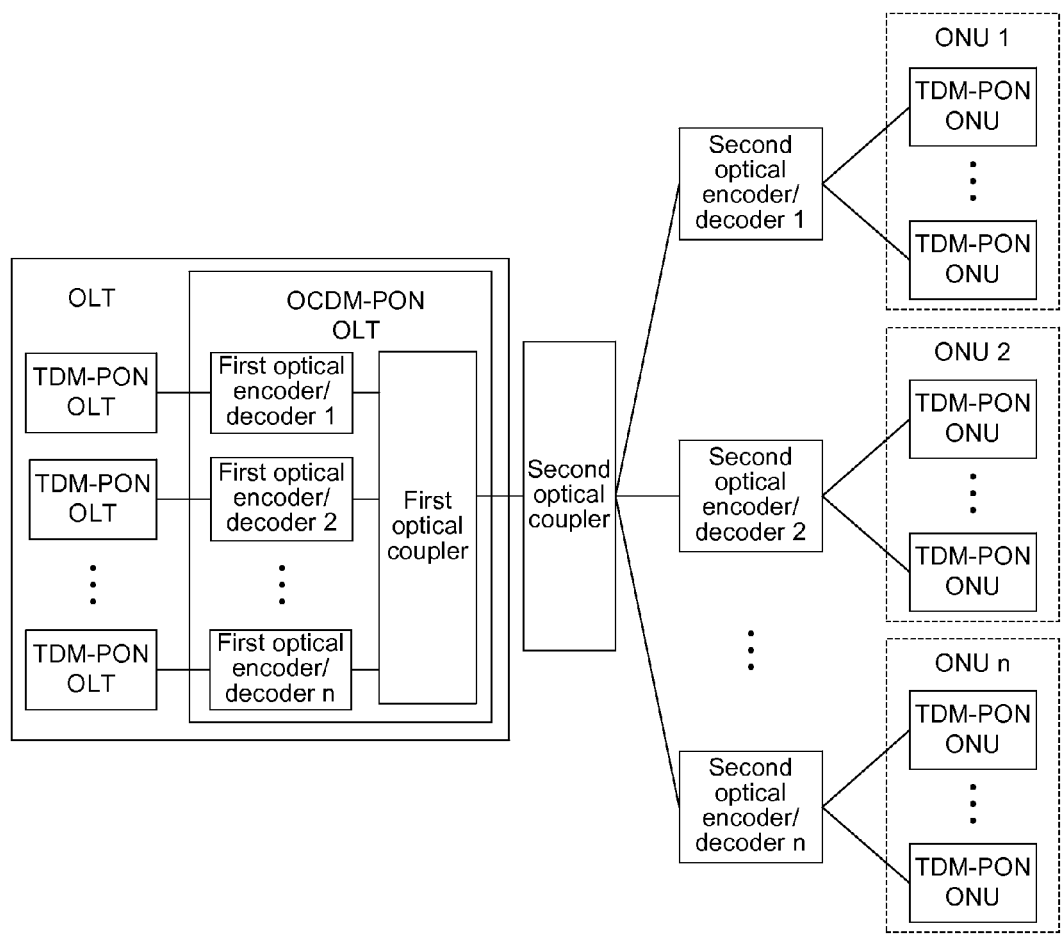
FIG. 8 shows a structure diagram of a hybrid PON system according to yet another embodiment of the disclosure.

As shown in FIG. 8, in another embodiment of the disclosure, a second optical encoder/decoder is set in an ODN. The difference between a hybrid passive PON network of the embodiment and that of the embodiment shown in FIG. 3 is that: the second optical encoding/decoding module is set in the ODN, and no optical encoding/decoding module is needed in the ONU, so that the structure of the ONU is simplified.

In the embodiment, the ODN includes: a second optical coupler connected with the OLT and configured to separate one line of downlink signals output by the OLT into multiple lines, synthesize received multiple lines of time-division multiplexed uplink signals into to one line and then output it; and a plurality of second optical encoding/decoding modules each configured to decode one line of downlink signals output by the second optical coupler, encode time-division multiplexed uplink signals output by the ONU and then output them to the second optical coupler. In the embodiment, the ONU includes: at least one second processing module connected with one of the plurality of second optical encoding/decoding modules, wherein each second processing module is configured to receive downlink signals output after being decoded by the second optical encoding/decoding module and to output time-division multiplexed modulated uplink signals to the second optical encoding/decoding module at a pre-allocated timeslot.

The second processing module of the embodiment can alao include: a downlink receiving module configured to receive downlink signals decoded by the second optical encoding/decoding module; an uplink modulation module configured to modulate at least one line of uplink signals to an optical carrier and output the modulated uplink signals to the second optical encoding/decoding module at a pre-allocated timeslot; and a second circulator through which the downlink receiving module and the uplink modulation module are connected with the second optical encoding/decoding module. In the embodiment, the specific structure of each module can be referred to the description above and no further description is needed here.

The embodiment of the disclosure further provides an OLT, which includes: a signal processing module configured to modulate and encode at least one line of time-division multiplexed downlink signals, wherein different encoding being applied to different lines of the downlink signals; and further configured to receive uplink signals, decode the received uplink signals and then output them, wherein the uplink signals are uplink signals output by an ONU after the ONU encodes at least one line of time-division multiplexed uplink signals, wherein different encoding being applied to different lines of the time-division multiplexed uplink signals; and a first optical coupler connected with the signal processing module, and configured to synthesize all lines of downlink signals encoded by the signal processing module into one line and then output it; and configured to receive uplink signals, and separate the received uplink signals into multiple lines and then output them to the signal processing module.

Preferably, in the OLT of the embodiment, the signal processing module includes: at least one first processing module, wherein each first processing module includes: a first time-division-multiplexing processing module configured to modulate at least one line of time-division-multiplexed downlink signals to an optical carrier and then send the modulated downlink signals, and configured to receive uplink signals and output the received uplink signals; and a first optical encoding/decoding module connected with the first time-division-multiplexing processing module and configured to encode downlink signals sent from the first time-division-multiplexing processing module and then output the encoded downlink signals, and configured to receive uplink signals, decode the received uplink signal and output them to the connected first time-division-multiplexing processing module; and a first optical coupler further connected with each first optical encoding/decoding module of each first processing module, and configured to synthesize downlink signals output after being encoded by the each encoding/decoding module of the each first processing module into one line and output it; and configured to receive uplink signals, separate the received uplink signals into multiple lines and output them to the connected first optical encoding/decoding module.

In another aspect, one embodiment of the disclosure provides an ONU, which includes:

a second optical encoding/decoding module configured to decode downlink signals output by an OLT through an ODN, encode received time-division multiplexed uplink signals and then output the encoded uplink signals to the OLT through the ODN, wherein the downlink signals output by the OLT are signals output after at least one line of time-division multiplexed downlink signals is modulated and encoded, wherein different encoding being applied to different lines of the time-division multiplexed downlink signals; and at least one second processing module connected with the second optical encoding/decoding module, wherein each second processing module is configured to receive downlink signals output after being decoded by the second optical encoding/decoding module, and output time-division multiplexed modulated uplink signals to the second optical encoding/decoding module.

Preferably, each of the second processing modules includes:

a downlink receiving module configured to receive downlink signals decoded by the second optical encoding/decoding module;

an uplink modulation module configured to modulate at least one line of uplink signals to an optical carrier and output the modulated uplink signals to the second optical encoding/decoding module at a pre-allocated timeslot; and a second circulator through which the downlink receiving module and the uplink modulation module are connected with the second optical encoding/decoding module.

Preferably, the second processing module above further includes:

a second circulator through which the downlink receiving module and the uplink modulation module are connected with the second optical encoding/decoding module.

The embodiment further provides an ODN apparatus, which includes: a second optical coupler configured to separate one line of downlink signals output by an OLT into multiple lines, synthesize received multiple lines of time-division multiplexed uplink signals into to one line and then output it to the OLT, wherein the downlink signals output by the OLT are signals output after at least one line of time-division multiplexed downlink signals is modulated and encoded, wherein different encoding being applied to different lines of the time-division multiplexed downlink signals; and a plurality of second optical encoding/decoding modules each configured to decode one line of downlink signals output by the second optical coupler, encode time-division multiplexed uplink signals output by an ONU and then output them to the second optical coupler.

The above are only the preferred implementations of the disclosure. It should be noted that, various modifications and changes can be made to the disclosure for those skilled in the art without departing from the principle of the disclosure. The modifications and changes are deemed to fall within the scope of protection of the disclosure.

The invention claimed is:

1. A hybrid Passive Optical Network (PON) system, comprising:

an Optical Line Terminal (OLT) configured to modulate and encode at least one line of time-division-multiplexed downlink signals, wherein different encoding being applied to different lines of the downlink signals, and to synthesize the downlink signals encoded into one line and then output it; and further configured to receive uplink signals, and decode the uplink signals received and then output them;

an Optical Distribution Network (ODN) configured to receive downlink signals output from the OLT, separate the downlink signals received into multiple lines and then output them directly or output them after decoding; and further configured to receive uplink signals and synthesize the uplink signals received into one line, and then output it to the OLT, or encode received multiple lines of time-division-multiplexed uplink signals and synthesize the signals encoded into one line, and then output it to the OLT, wherein different encoding being applied to different lines of the time-division-multiplexed uplink signals;

at least one Optical Network Unit (ONU) each configured to receive downlink signals directly output from the ODN, decode the downlink signals received and output them, or output the downlink signals received which are output from the ODN after being decoded by the ODN; and further configured to encode one line of time-division-multiplexed uplink signals, wherein different encoding being applied to different lines of the time-division-multiplexed uplink signals, and output the uplink signals encoded to the ODN, or directly output the time-division-multiplexed uplink signals to the ODN which encodes the uplink signals and then outputs them to the OLT;

wherein the OLT comprises:

a signal processing module configured to modulate and encode at least one line of time-division multiplexed downlink signals, wherein different encoding being applied to different lines of the downlink signals; and further configured to receive uplink signals, decode the uplink signals received and then output them, wherein the uplink signals are uplink signals output by an ONU after the ONU encodes, based on OCDMA, at least one line of time-division multiplexed uplink signals, wherein different encoding being applied to different lines of the time-division multiplexed uplink signals;

a first optical coupler connected with the signal processing module, and configured to synthesize all lines of downlink signals encoded by the signal processing module into one line and then output it; and configured to receive uplink signals, and separate the uplink signals received into multiple lines and then output them to the signal processing module:

wherein the signal processing module comprises: at least one first processing module and a first optical coupler, wherein each first processing module comprises: a first time-division-multiplexing processing module and a first optical encoding/decoding module, wherein the first time-division-multiplexing processing module is configured to modulate at least one line of time-division-multiplexed downlink signals to an optical carrier, then send the modulated downlink signals; and configured to receive uplink signals and output the received uplink signals;

the first optical encoding/decoding module is connected with the first time-division-multiplexing processing module and configured to encode downlink signals sent from the first time-division-multiplexing processing module and then output the downlink signals encoded; and configured to receive uplink signals, decode the received uplink signal and output them to the connected first time-division-multiplexing processing module;

the first optical coupler is further connected with each first optical encoding/decoding module included in each first processing module, and configured to synthesize downlink signals output after being encoded by the each encoding/decoding module of the each first processing module into one line and output it; and configured to receive uplink signals, separate the uplink signals received into multiple lines and output them to the connected first optical encoding/decoding module;

the ONU comprises:

a second optical encoding/decoding module configured to decode downlink signals output by an OLT through an ODN, encode received time-division multiplexed uplink signals and then output the encoded uplink signals to the OLT through the ODN, wherein the downlink signals output by the OLT are signals output after at least one line of time-division multiplexed downlink signals is modulated and encoded based on OCDMA, wherein different encoding being applied to different lines of the time-division multiplexed downlink signals;

at least one second processing module connected with the second optical encoding/decoding module, wherein each second processing module is configured to receive downlink signals output after being decoded by the second optical encoding/decoding module, and output time-division multiplexed modulated uplink signals to the second optical encoding/decoding module;

the ODN comprises:

a second optical coupler configured to separate one line of downlink signals output by an OLT into multiple lines, synthesize received multiple lines of time-division multiplexed uplink signals into to one line and then output it to the OLT, wherein the downlink signals output by the OLT are signals output after at least one line of time-division multiplexed downlink signals is modulated and encoded based on OCDMA, wherein different encoding being applied to different lines of the time-division multiplexed downlink signals;

a plurality of second optical encoding/decoding modules each configured to decode one line of downlink signals output by the second optical coupler, encode time-division multiplexed uplink signals output by an ONU and then output them to the second optical coupler.

2. The optical network system according to claim 1, wherein the first time-division-multiplexing processing module comprises:

a downlink modulation module configured to modulate at least one line of time-division multiplexed downlink signals to an optical carrier and then send the modulated downlink signals to the connected first optical encoding/decoding module;

an uplink receiving module configured to receive uplink signals output after being decoded by the first optical encoding/decoding module, and output the received uplink signals.

3. The optical network system according to claim 2, wherein the first time-division-multiplexing processing module further comprises:

a first circulator through which the downlink modulation module and the uplink receiving module are connected with the first optical encoding/decoding module.

4. The optical network system according to claim 1, wherein the second processing module comprises:

a downlink receiving module configured to receive downlink signals decoded by the second optical encoding/decoding module;

an uplink modulation module configured to modulate at least one line of uplink signals to an optical carrier and output the modulated uplink signals to the second optical encoding/decoding module at a pre-allocated timeslot;

a second circulator through which the downlink receiving module and the uplink modulation module are connected with the second optical encoding/decoding module.

5. An Optical Line Terminal (OLT), comprising:

a signal processing module configured to modulate and encode at least one line of time-division multiplexed downlink signals, wherein different encoding being applied to different lines of the downlink signals; and further configured to receive uplink signals, decode the uplink signals received and then output them, wherein the uplink signals are uplink signals output by an Optical Network Unit (ONU) after the ONU encodes, based on Optical Code Division Multiple Access (OCDMA), at least one line of time-division multiplexed uplink signals, wherein different encoding being applied to different lines of the time-division multiplexed uplink signals;

a first optical coupler connected with the signal processing module, and configured to synthesize all lines of downlink signals encoded by the signal processing module into one line and then output it; and configured to receive uplink signals, and separate the uplink signals received into multiple lines and then output them to the signal processing module;

wherein the signal processing module comprises: at least one first processing module and a first optical coupler, wherein each first processing module comprises: a first time-division-multiplexing processing module and a first optical encoding/decoding module, wherein the first time-division-multiplexing processing module is configured to modulate at least one line of time-division-multiplexed downlink signals to an optical carrier, then send the modulated downlink signals; and configured to receive uplink signals and output the received uplink signals;

the first optical encoding/decoding module is connected with the first time-division-multiplexing processing module and configured to encode downlink signals sent from the first time-division-multiplexing processing module and then output the downlink signals encoded; and configured to receive uplink signals, decode the received uplink signal and output them to the connected first time-division-multiplexing processing module;

the first optical coupler is further connected with each first optical encoding/decoding module included in each first processing module, and configured to synthesize downlink signals output after being encoded by the each encoding/decoding module of the each first processing module into one line and output it; and configured to receive uplink signals, separate the uplink signals received into multiple lines and output them to the connected first optical encoding/decoding module.

6. An Optical Network Unit (ONU), comprising:

a second optical encoding/decoding module configured to decode downlink signals output by an Optical Line Terminal (OLT) through an Optical Distribution Network (ODN), encode received time-division multiplexed uplink signals and then output the encoded uplink signals to the OLT through the ODN, wherein the downlink signals output by the OLT are signals output after at least one line of time-division multiplexed downlink signals is modulated and encoded based on Optical Code Division Multiple Access (OCDMA), wherein different encoding being applied to different lines of the time-division multiplexed downlink signals;

at least one second processing module connected with the second optical encoding/decoding module, wherein each second processing module is configured to receive downlink signals output after being decoded by the second optical encoding/decoding module, and output time-division multiplexed modulated uplink signals to the second optical encoding/decoding module.

7. An Optical Distribution Network (ODN) apparatus, comprising:

a second optical coupler configured to separate one line of downlink signals output by an Optical Line Terminal (OLT) into multiple lines, synthesize received multiple lines of time-division multiplexed uplink signals into to one line and then output it to the OLT, wherein the downlink signals output by the OLT are signals output after at least one line of time-division multiplexed downlink signals is modulated and encoded based on Optical Code Division Multiple Access (OCDMA), wherein different encoding being applied to different lines of the time-division multiplexed downlink signals;

a plurality of second optical encoding/decoding modules each configured to decode one line of downlink signals output by the second optical coupler, encode time-division multiplexed uplink signals output by an Optical Network Unit (ONU) and then output them to the second optical coupler.

* * * * *